United States Patent [19]

Peschges

[11] 4,443,145

[45] Apr. 17, 1984

[54] SELF-SEALING WASHER

[75] Inventor: Klaus-Jurgen Peschges, Laudenbach, Fed. Rep. of Germany

[73] Assignee: Firma Carl Freudenberg, Weinheim an der Bergstrasse, Fed. Rep. of Germany

[21] Appl. No.: 343,281

[22] Filed: Jan. 27, 1982

[30] Foreign Application Priority Data

Feb. 13, 1981 [DE] Fed. Rep. of Germany ... 8103909[U]

[51] Int. Cl.³ .............................................. F16B 43/00
[52] U.S. Cl. ..................................... 411/542; 411/369
[58] Field of Search ............... 411/368, 369, 370, 534, 411/541, 542, 531, 532, 533, 544, 900, 901, 149, 150, 155, 147, 156, 535, 137, 148, 313

[56] References Cited

U.S. PATENT DOCUMENTS

| 269,119 | 12/1882 | Rodney | 411/150 |
| 320,270 | 6/1885 | Mitchell | 411/150 |
| 1,641,059 | 8/1927 | Tausch | 411/149 X |
| 2,734,545 | 2/1956 | Nothdurft | 411/147 X |
| 3,009,722 | 11/1961 | Augustin | 411/542 X |
| 3,519,279 | 7/1970 | Wagner | 411/542 X |
| 4,092,896 | 6/1978 | Puchy | 411/542 |
| 4,280,390 | 7/1981 | Murray | 411/542 |

Primary Examiner—Thomas J. Holko
Assistant Examiner—Adrian Whitcomb
Attorney, Agent, or Firm—Kenyon & Kenyon

[57] ABSTRACT

A self sealing washer is disclosed which is made of three concentric, joined parts, an inner spacer ring, a middle sealing ring, and an outer spacer ring. The inner and outer rings are axially offset relative to each other and the sealing ring bridges the gap between the inner and outer rings.

10 Claims, 6 Drawing Figures

SELF-SEALING WASHER

BACKGROUND OF THE INVENTION

The invention relates to a self-sealing washer comprising a spacer ring and a sealing ring formed thereon.

A washer of a similar type has been described in the art. This washer of a known design is intended for sealing and simultaneous support of machine parts which are pressed against each other vertically, for instance, of the plane surfaces between the head of a machine screw and the machine part supported thereby. For several reasons, however, the use properties are not satisfactory.

This washer is made of a spacer ring with a rectangular profile, to which is vulcanized on the inside or outside circumference relative to the direction of pressure application, a sealing ring. The effectiveness, therefore, does not include sealing for pressures alternating in direction, which is a disadvantage.

The contact pressures of the sealing ring against the plane surfaces of the sealed machine parts result from the elastic pretensioning force generated by the deformation and the reaction forces of the sealed-off medium superimposed thereto. Thus, it does not provide constant sealing under changing pressures and can be impaired by fatigue of the elastomer material of the sealing ring.

Difficulties can arise during the installation if, during compression, the sealed surfaces are moved not only vertically but also transversely which occurs when using screws. Then, special, costly measures must be taken to prevent friction damage or destruction of the sealing ring. These measures include, for instance, providing a high finish of the plane surfaces and providing a centering hole for supporting the outside circumference. Also, repeated use of such washers after they are disassembled is not possible.

SUMMARY OF THE INVENTION

It is, therefore, an object of the invention to design a washer which eliminates these disadvantages. It is a further object to make a washer of an interchangeable design which allows for the sealing of pressures which change in direction and which can be used without special finishing of the sealed surfaces but nevertheless ensures a durable, good seal with a certain amount of reusability.

These and other objects are achieved by the invention which is directed to a self-sealing washer. The washer comprises an inner spacer ring joined along its outer circumference to a concentric middle sealing ring joined along its outer circumference to an outer spacer ring. A circular gap separates the inner and outer concentrically related rings. Enclosed in the gap is the sealing ring of a constant-volume resilient material which axially offsets the inner and outer rings relative to each other and bridges the overall distance between them. There is at least one conical, circular clamping surface present along the edge of the inner and/or outer ring which contacts the sealing ring. The clamping surface protrudes into the gap and is inclined so that a reduction of the volume of the sealing ring results when the mutual axial distance between the outer and inner ring is decreased. The sealing ring is confined on both sides in the radial and axial direction by the edge surfaces of the inner and outer spacer rings. The spacer rings comprise a hard material, for instance, metal which is resistant to mechanical wear and damage. The dimension of the profile in the radial direction is nearly constant. In the axial direction, a decrease of the overall axial dimension or washer thickness can be obtained when the sealed surfaces are pressed together. The minimum thickness of the washer is reached when inner and outer rings are positioned in the same plane and jointly serve to transmit sealing force to the connected machine part.

BRIEF DESCRIPTION OF THE DRAWINGS

The Figures depict several embodiments of the invention.

DETAILED DESCRIPTION OF THE INVENTION

Figure 1:
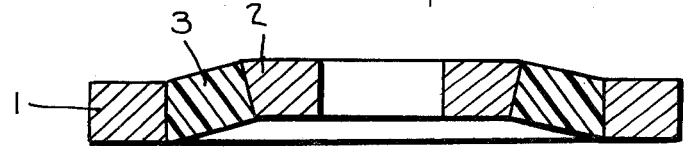
FIG. 1 shows a washer in a longitudinal-section view, in which the gap containing the sealing ring 3 is bounded by a cylindrical inside surface of the outer ring 1 and by a conical clamping surface of the inner ring 2.
Figure 3:
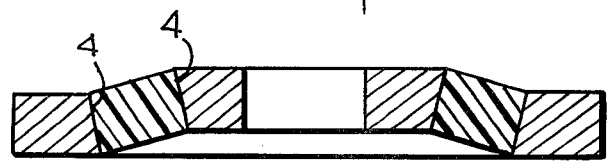
FIG. 3 shows a washer wherein the surface 4 of the outer ring bounding the sealing ring is also a conical clamping surface.
Figure 4:
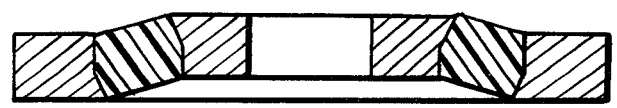
FIG. 4 shows a washer wherein the clamping surfaces cover only part of the edge surfaces of the inner and outer rings bounding the sealing ring while the remaining part is of cylindrical shape.
Figure 5:
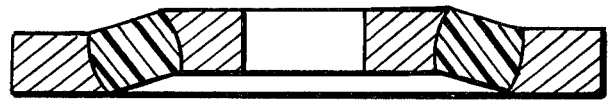
FIG. 5 shows a washer wherein the clamping surfaces extend in different regions under different cone angles which merge into each other uniformly.
Figure 6:
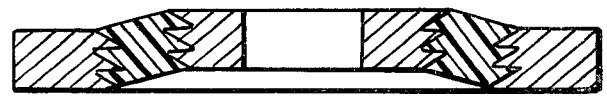
FIG. 6 shows a washer wherein the inner ring and the outer rings each have several clamping surfaces which are arranged one behind the other in the axial direction and which are connected by separating surfaces extending perpendicularly to the clamping direction.
Figure 2:
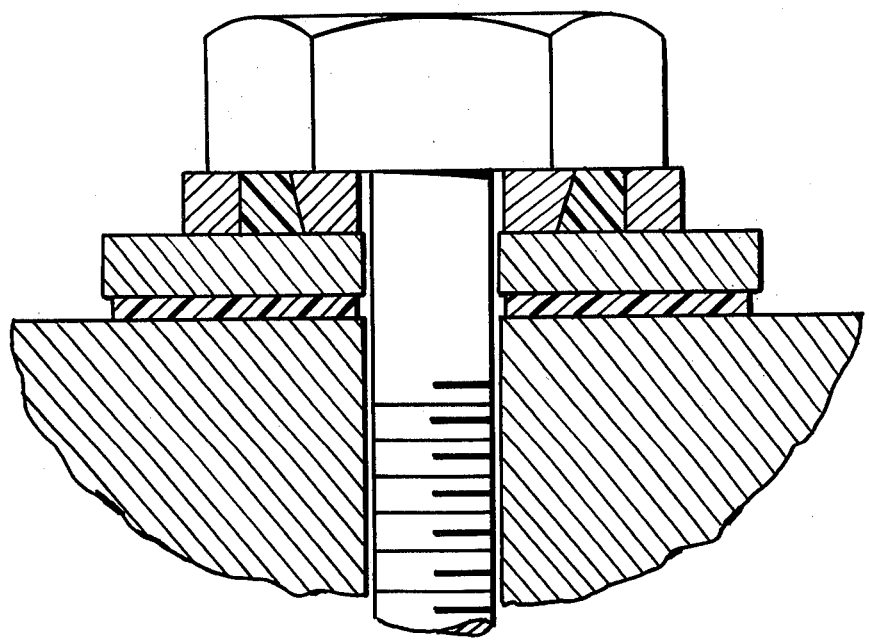
FIG. 2 shows the washer according to FIG. 1 with tensioned sealing ring after installation.

When the three part washer of the invention is sealably fitted into a machine, a reduction of the volume of the sealing ring is obtained due to the continuous parallel wedge action displacement of the conical clamping surface (s). Thereby, pressure of the axial boundary surfaces of the sealing ring is applied on both sides against the surfaces to be sealed. The sealing effect achieved can thus be compared with hydraulic compression. It is independent of elastic properties of the sealing ring and is thereby independent of the material-related fatigue phenomena after extended stress. The recovery force, which improves with increasing elasticity, after prior use, however, ensures repeated reusability. Reusability, in turn, depends upon the nature of the end faces of the sealing ring which come in contact with the machine elements to be sealed. If they have lost their pliability, for instance, due to impressed dirt or through the action of the sealed-off medium, the washer cannot be reused. Both of these factors are substantially dependent on the specific application. In general, however, under the conditions of typical machine design, at least two-time reusability is possible.

The sealing ring may be produced from any resilient material. In particular, polytetrafluoroethylene has proven itself as a thermoplastic material. Polypropylene and polyamide are also desirable. Other suitable resilient materials include acrylnitrilbutadiene (NBR) and fluoridized rubber (FKM), rubber, plastic or soft metal. The Shore hardness of the elastomer material should not exceed the range of Shore A50 to 90. If foamed materials are used, the pore structure should be of the closed-cell type so as to ensure an internal pressure build-up and thus, the required incompressibility. High thermal stressability can be achieved if the sealing ring is made from a soft metal, preferably of tin solder or copper.

Particularly simple handling in the assembly and disassembly of the sealing ring is obtained if the inner ring, the sealing ring and the outer ring are joined together as one piece. The joint need not be distinguished by especially great strength but it must be durable against undesirable dissolution under the action of the sealed-off medium and/or elevated temperatures. Fabrication in parallel and generation of the sealing ring through direct injection of elastomer material into the gap between the inner and outer ring and subsequent vulcanization has been found to be particularly practical.

The volume reduction of the gap, which is desirable with respect to the sealing action, upon axial compression of the outer and inner ring can be achieved by a single conical circular clamping surface or the inner or outer ring. Due to the "hydraulic principle" applied, it is sufficient if the clamping surface forms only part of the axial width of the surface of the inner or outer ring confining the gap, while the remaining part is oriented parallel to the axis. The forces exerted by the sealing ring onto the adjoining parts after the volume of the gap has been reduced, and therefore also to the sealed surfaces, are specifically the same in all regions. It is therefore possible in regard to the sealing operations if the surface of the inner and/or outer ring defining the gap is interrupted by several clamping surfaces which are arranged one behind the other in the axial direction.

The compression forces of the sealing ring exerted on the machine elements to be sealed result from the volume reduction of the gap receiving the sealing ring and are brought about by the axial compression of the inner and outer ring. The volume reduction is substantially determined by the angle enclosed between the clamping surfaces and the direction of the forces introduced into the corresponding inner or outer ring as well as by the share of the clamping surfaces in the entire contact surfaces of the inner and outer rings with the sealing ring. A comparable sealing effect can therefore be obtained by multiple variations of the specific design.

In general machine design, it is desirable that the theoretical volume reduction of the gap causing the tension of the sealing ring does not exceed the range of 5 to 30%. If the volume is reduced less, a contact pressure of the sealing ring is frequently insufficient for a good seal. With a larger volume reduction gap, excessive extrusion of parts of the sealing ring occur which can lead to the destruction of the sealing ring. This especially occurs when a transverse movement is superimposed on the vertical clamping movement of the machine elements to be sealed. In both respects, excellent reliability and good sealing action are obtained with good reusability if the theoretical volume reduction is 10 to 20%. The angle enclosed between the clamping surfaces and the direction of motion of the respective part should not exceed a range of 10° to 45°.

The washer, according to the invention, can be used like a conventional washer and can have the dimensions of such washers. It additionally brings about sealing of the gap against adjacent machine parts to liquid and gases and can be used repeatedly.

With reference to the drawings, the sealing effect obtained is based on the fact that the inner 2 and outer 1 spacer rings are divided by a circular gap, are related to each other concentrically, are offset axially relative to each other and bridging the two rings is a sealing ring which in the untensioned condition has a greater overall thickness than the spacer rings. The sealing ring consists of a resilient material, for instance, of rubber, plastic or soft metal, while the outer ring and the inner ring consist of hard material as non-resilient as possible, for instance, of steel in order to ensure a good support of the connected machine part. The design must be such that the compression or tension stress produced in the inner and outer ring by the deformation of the sealing ring does not exceed the elastic limit of the material used, so that detrimental plastic deformation is avoided.

The gap between the outer and inner ring is completely filled by the sealing ring 3, and the gap is narrowed at least partially by at least one conically circular clamping surface of the inner and/or outer ring, which is inclined so that a reduction of the volume enclosed in the interspace is obtained with a reduction of the axially offset of the inner and outer ring. Thereby, an internal force is built-up in the sealing ring, which causes an axial pressure of the end faces on both sides against the adjacent machine parts, and thereby, a seal which is elastic due to the corresponding elastic radial expansion of the outer ring or the radial compression of the inner ring. The compression process as such obeys the hydraulic principle, whereby the same pressure forces are obtained in all subregions of the end faces. Irregularities at the surface of the machine parts to be sealed are thereby bridged in an excellent manner and good tightness is obtained which is independent of the direction of the pressure action and of pressure variations or pressure changes.

The magnitude of the pressure force depends substantially on the volume reduction of the gap which results if the originally present axial offset of the inner and outer ring is compensated by the mutual axial pressure as well as by the elastic properties of the inner and outer ring. Good sealing action and good reusability are achieved under the conditions of general machine design if the clamping surfaces are designed so that a theoretical volume reduction by 5 to 30% and preferably 10 to 20% is obtained.

What is claimed is:

1. A self-sealing washer, comprising an inner spacer ring, a concentric middle sealing ring and a concentric outer spacer ring, wherein the spacer rings are made of non-resilient material, the sealing ring is made of resilient, constant volume material, a circular gap separates the inner ring and the outer ring which are axially offset relative to each other, the sealing ring bridges the gap and at least one conically circular clamping surface of the inner and/or outer ring projects into the gap which is inclined so that a reduction of the volume of the sealing ring results when the mutual axial distance of the spacer rings is reduced.

2. A washer according to claim 1 wherein the sealing ring consists of a thermoplastic material.

3. A washer according to claim 1 wherein the sealing ring consists of an elastomer material.

4. A washer according to claim 2 or 3 wherein the thermoplastic or elastomer material has a structure with closed pores.

5. A washer according to claim 2 or 3 wherein the sealing ring consists of a soft metal.

6. A washer according to claims 1, 2 or 3 wherein the inner ring, the sealing ring and the outer ring are joined together in one piece.

7. A washer according to claims 1, 2 or 3 wherein the inclination and axial dimension of the clamping surface is matched to the total volume of the gap, with the sealing ring released in such a manner that a volume reduction of 5 to 30% is obtained when the sealing ring is tensioned by placing the inner and outer rings in the same plane.

8. A washer according to claims 1, 2 or 3 wherein the clamping surface is matched as to inclination and axial dimension to the total volume of the gap, with the sealing ring released, in such a manner that a volume reduction by 10 to 20% is obtained when the sealing ring is tensioned by placing the inner and outer rings in the same plane.

9. A washer according to claims 1, 2 or 3 wherein the profile of the inclination of the clamping surface makes an angle of 10° to 50° with the clamping direction.

10. A washer according to claims 1, 2 or 3 wherein the inner and outer rings have clamping surfaces extending parallel to each other.

* * * * *